Sept. 27, 1966   J. H. EDMISTEN   3,274,791
CONTROL SYSTEM FOR ICE MACHINE
Filed July 1, 1965
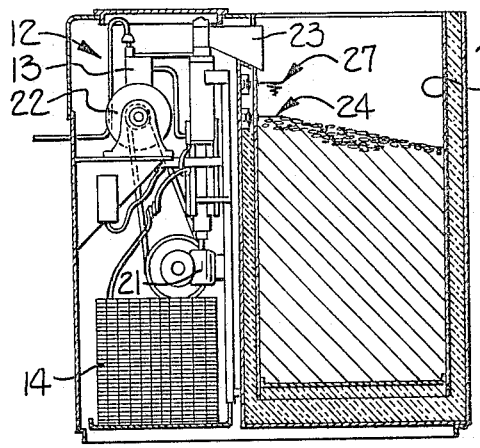
Fig-1
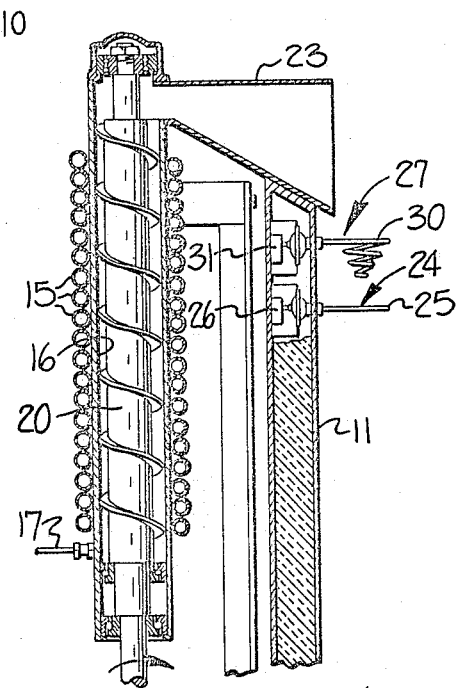
Fig-2
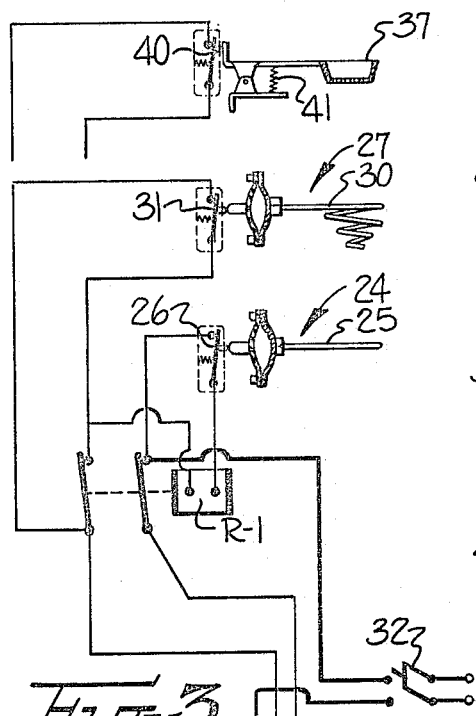
Fig-3
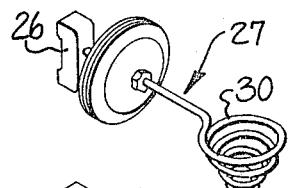
Fig-4
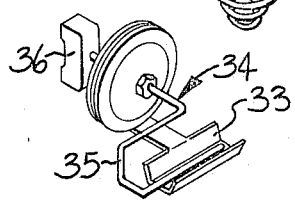
Fig-5
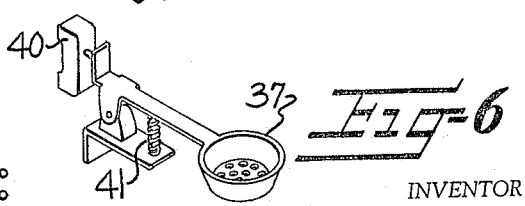
Fig-6
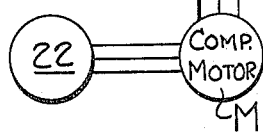
INVENTOR:
JOHN H. EDMISTEN
BY Garratt, Bell, Seltzer, Park & Heard
ATTORNEYS

United States Patent Office 3,274,791
Patented Sept. 27, 1966

3,274,791
CONTROL SYSTEM FOR ICE MACHINE
John H. Edmisten, 418 W. Main St., Boone, N.C.
Filed July 1, 1965, Ser. No. 468,895
6 Claims. (Cl. 62—137)

My invention pertains to a control system for an ice machine, and more particularly, to an improved control system effective to prevent damage to the ice producing mechanism of a flake ice machine.

In situations where ice is required in flake or chip form, as distinct from cubes or larger blocks, it is conventional to use machines producing flake or chip ice substantially continuously as required. While various structures have been proposed for the ice producing mechanism of such flake ice machines, most conventional flake ice machines employ a freezing surface, typically the interior wall surface of a cylindrical freezing chamber which is refrigerated to form ice thereon, and a harvesting means, such as a rotatable auger member extending along the central axis of the cylindrical freezing chamber, adapted to contact the ice on the freezing surface upon relative movement between the freezing surface and harvesting means to remove the ice from the freezing surface in small flakes or chips and to deliver the ice to a storage bin or end use requirement.

Usually, the end use requirement of flake or chip ice produced by such a machine is not continuous, and the machine is operated intermittently as required by such end use. For example, when used at a soda fountain, restaurant, or the like, ice produced by the ice producing mechanism is typically delivered into a means for receiving and storing flake ice, such as a storage bin, and accumulated for subsequent later use as required. A control system is provided in association with such a storage means and is responsive to the quantity of ice stored, to intermittently cycle the ice producing mechanism to produce ice as needed to replenish the quantity stored.

Such flake ice machines suffer from at least one major deficiency, in that when a cycle of ice production is stopped by the control system upon the sensing of a desired predetermined quantity of ice in the storage means, the temperature of the freezing surface continues for a period of time at a temperature substantially below freezing. During this period of time, ice continues to form on the freezing surface and, as the harvesting means is not operated, shortly reaches a thickness greater than can be removed by the harvesting means. When, during such an over-iced condition, a sufficient quantity of ice removed from the storage means to cause the control system to initiate a cycle of ice production, the harvesting means and drive for the harvesting means are not capable of removing the excess ice. As a result, the harvesting means will mechanically fail, by breaking the auger member, or the harvesting means drive, which typically includes an electrical motor, will fail electrically by overloading the drive motor. In either instance, the ice machine becomes inoperative and replacement of substantial portions of the ice producing mechanism is required.

It is an object of this invention to avoid the aforementioned deficiency of conventional flake ice machines by providing a novel control system which will delay the initiation of a cycle of ice production until such time as an over-iced condition has been relieved.

A more specific object of this invention is to provide, in a flake ice machine control system, means for receiving and retaining a portion of the ice produced during a cycle of ice production and for delaying the initiation of the next cycle of ice production until such time as the retained ice has melted, in order to avoid the initiation of a cycle during an over-iced condition and the consequent damage to the ice machine.

Some of the objects of the invention having been stated, other objects will appear as the description proceeds, when taken in connection with the accompanying drawings, in which:

FIGURE 1 is a sectional side view of a flake ice machine incorporating the control system of this invention;

FIGURE 2 is a detail view, in section, of a portion of the machine of FIGURE 1;

FIGURE 3 is a schematic illustration of the wiring diagram of a flake ice machine incorporating the control system of this invention;

FIGURE 4 is a perspective view of one form of ice receiving and retaining means in accordance with this invention;

FIGURE 5 is a perspective view of a second form of ice receiving and retaining means in accordance with this invention; and FIGURE 6 is a perspective view of a third form of ice receiving and retaining means in accordance with this invention.

Referring now more specifically to the drawing, FIGURES 1 and 2 illustrate a flake ice machine, indicated generally at 10, and a detail of the machine mechanism. The flake ice machine 10, as is conventional, includes a storage bin 11 and a flake ice producing mechanism, indicated generally at 12, for producing flake ice and directing the same into the bin 11 for storage until needed. The flake ice machine 10 here illustrated is of the type which is conventionally used in a restaurant or soda fountain, and has been chosen for illustrative purposes only, as it is recognized that the flake ice producing mechanism 12 might equally well supply flake ice to an end use device or a storage means somewhat dissimilar from the bin 11.

The ice producing mechanism 12 includes a mechanical refrigeration system of conventional type, using a hermetically sealed self-contained compressor 13, a condenser coil 14, and an evaporator coil 15. As best illustrated in FIGURE 2, the evaporator coil 15 encircles a cylindrical freezing chamber 16, and cools that chamber to produce ice therein. Water is supplied to the interior of the freezing chamber 16 through a water line 17, and the water level within the freezing chamber is controlled, by a reserve chamber, to extend to a height within the freezing chamber below the outlet from the freezing chamber, for purposes to be made more clear hereinafter. When water is so supplied to the freezing chamber 16, which is adapted to be refrigerated by the evaporator coil 15 of the mechanical refrigeration system, ice is formed on the inner surface of the freezing chamber 16, which is here denominated a freezing surface.

In order to remove ice formed on the freezing surface in flake or chip form, a harvesting means is provided in the form of an auger member 20, disposed centrally of the freezing chamber 16 and supported for rotation about an axis coextensive with the axis of the freezing chamber. Suitable seals and bearings are provided at the lower end of the auger member 20 to support the same for rotation and to prevent the leakage of water downwardly and out of the freezing chamber 16, and the position of the auger member 20 is carefully controlled so that the outer extremities of the threads or screws of the auger are in close proximity to the freezing surface at all points along the outer surface of the threads.

On rotation of the auger member 20, as indicated by the arrow in FIGURE 2, by suitable means such as a gear transmission 21 which may be belt driven from a suitable drive motor 22, ice formed on the freezing surface is engaged by the threads of the auger member 20 and removed in flake form for delivery by the auger member 20 to the upper end of the freezing chamber 16. The flake ice thus produced is then delivered from the ice producing mechanism 12 to the storage bin 11 through a suitable discharge chute 23. The production of flake ice in this manner is substantially continuous during a cycle refrigeration and harvesting, or ice production, while the mechanical refrigeration system is operated, so long as water is supplied to the freezing chamber 16.

In order to produce ice only in the quantities demanded for use, it is conventional to provide a control system for controlling the cycling of ice production in response to the quantity of ice stored in the bin. Typically, such a control system employs a bin thermostat, indicated generally at 24, positioned at some height within the bin 11, which is considered to permit the accumulation of a suitable quantity of ice in the bin 11 for storage purposes. Such a bin thermostat 24 preferably comprises a capillary tube 25 and associated electrical contacts such as in a microswitch 26, the function of which will be more fully described hereinafter. When a sufficient quantity of ice is produced by the ice producing mechanism 12 and discharged into the bin 11 to fill the bin to the level of the bin thermostat 24, as generally indicated in FIGURE 1, the contact of the flake ice with the bin thermostat 24 is effective to stop the ice production cycle. The ice producing mechanism 12 is not subsequently operated until a sufficient quantity of ice is removed from the bin 11 to permit the bin thermostat 24 to warm to the temperature of ambient air within the bin and initiate a cycle of ice production.

Upon stopping of the cycle of ice production due to a bin filled condition, as sensed by the bin thermostat 24, the evaporator coil 15 of the mechanical refrigeration system does not promptly return to a temperature above freezing, but remains for some time at or near the operating temperature, which is substantially below freezing. As a result, ice continues to form on the freezing surface within the freezing chamber 16, but is not harvested as the auger member 20 is no longer rotating. Under this over-iced condition, should a cycle of ice production be promptly initiated by the quick removal of a quantity of ice from the bin 11 sufficient to permit the bin thermostat 24 to again restart the ice producing mechanism 12, mechanical or electrical failure of the harvesting means would result as the excess quantity of ice could not be removed from the freezing surface of the freezing chamber 16.

In order to delay initiation of a subsequent cycle of ice production, my invention provides means for receiving and retaining a portion of the ice produced during a cycle of ice production and means responsive to the retention of ice by the receiving means for precluding the initiation of a cycle of ice production during the retention of ice by the ice receiving means. Three specific forms of means for receiving ice and means responsive to the retention of ice have been illustrated in the drawing, and will be now described.

A first form of ice receiving means and means responsive to the retention of ice is illustrated with particularity in FIGURES 1, 2, and 4. There, a thermostatic switch, indicated generally at 27, is provided, which includes a capillary tube 30 and associated electrical contacts, such as in a microswitch 31, which are opened and closed in response to temperature differentials sensed by the capillary tube 30, as is conventional with a thermostatic switch. The capillary tube 30 of the thermostatic switch 27 is wound into a conical coil (FIGURE 4), and the switch 27 is positioned within the flake ice machine 10 with the coiled capillary tube 30 disposed in the path of delivery of flake ice from the ice producing mechanism 12 to the bin 11 (FIGURE 2).

During the production of ice by the ice producing mechanism 12, a portion of the ice produced and delivered into the bin 11 is received and retained by the coiled capillary tube 30. In response to the retention of ice by the coiled capillary tube 30, the electrical contacts of the thermostatic switch 27 are opened, as will be more fully described hereinafter with respect to the operation of the control system in accordance with this invention. Subsequently, on melting of the ice retained by the coiled capillary tube 30, the water resulting from the melting ice will pass from the open conical coil of the capillary tube 30, and permit the thermostatic switch 27 to warm to the temperature of the ambient air within the bin and close the associated contacts.

The operation of the control system in accordance with this invention is best described in conjunction with a schematic wiring diagram (FIGURE 3). There, the bin thermostat 24 and thermostatic control switch 27 are shown in conjunction with a control relay R1, the compressor motor M which provides a drive for the mechanical refrigeration system and the auger motor 22 which provides a drive for the harvesting means. Suitable line voltage is applied to the control system through a main switch 32, and the relay R1 is controlled by the contacts of the bin thermostat 24 and thermostatic switch 27 to in turn control the application of line current to the compressor and auger motors and initiate or terminate a cycle of ice production. Inasmuch as the main switch 32 is shown in a disconnected or open condition, the relay R1 is shown with the armatures in the open position. When the main switch 32 is closed, with the contacts of the bin thermostat 24 and thermostatic switch 27 closed due to there being no ice retained in the bin 11, line voltage is applied to the compressor motor M and auger motor 22 and, through the contacts of the bin thermostat 24 and switch 27, to the winding of the relay R1. The armatures of the relay R1 are thereupon drawn to the closed or operating position as ice production is initiated and continues to occur.

As production continues, ice passing from the ice producing mechanism 12 into the bin 11 is received and retained by the coiled capillary tube 30, and the electrical contacts associated with the thermostatic switch 27 are opened. In this circumstance, the relay R1 continues to be energized and held in an operating position by the contacts of one armature, wired in parallel with the contacts of the thermostatic switch 27. On production of sufficient ice to fill the bin 11 to the level of the bin thermostat 24, the contacts of the bin thermostat 24 are opened and the relay R1 is deenergized to move the armatures of the relay to a non-operating condition and interrupt the flow of line current to the compressor and auger motors. The production of ice is thus stopped but, as outlined above, an over-iced condition will begin to occur, during which time operation of the harvesting means would result in mechanical or electrical failure of the ice producing mechanism 12.

During this interim, the ice received and retained by the capillary coil 30 will begin to melt, but will retain the contacts of the thermostatic switch 27 open. Should sufficient ice now be removed from the bin 11 to remove ice from contact with the bin thermostat 24 and result in the contacts thereof closing so as to otherwise energize the relay coil R1, the open contacts of thermostatic switch 27 and the armature with which that switch is wired in parallel will prevent the application of line current to the relay R1 and thus delay initiation of a cycle of ice production. When the ice received and retained by the capillary coil 30 has melted, and the resulting water is drained from that coil, the thermostatic switch 27 will warm to the temperature of ambient air within the bin 11, and permit the contacts thereof to close. A circuit is then completed which will permit the application of line voltage to the relay R1, and move the armatures of the relay to an operating position to initiate a cycle of ice production.

Should the ice received and retained by the capillary coil 30 melt prior to the removal of a sufficient quantity of ice from the bin 11 to expose the bin thermostat 24 to ambient air conditions within the bin, a cycle of ice production will be initiated on removal of a sufficient quantity of ice to require that more be produced.

It has been found that delaying the initiation of a cycle of ice production for the period of time required to melt the portion of previously produced ice received and retained by the capillary coil 30 is sufficient to entirely avoid the dangers of an over-iced condition, inasmuch as the ice received and retained by the capillary coil 30 melts at substantially the same rate as the excessive ice formed within the freezing chamber 16.

A second form of means for receiving and retaining a portion of the ice produced and means responsive to the retention of ice for delaying the initiation of a cycle of ice production is illustrated in FIGURE 5. There, an ice receiving tray 33 is shown, which tray has open ends for the passage of water therefrom. A thermostatic switch, indicated generally at 34, has a capillary tube 35 positioned within the tray 33 and associated electrical contacts, such as in a microswitch 36, which are opened and closed in response to temperature differentials sensed by the capillary tube 35, as described previously with regard to thermostatic switch 27.

In operation, the tray 33 is positioned in the path of travel of ice discharged from the ice producing mechanism 12 into the bin 11, to receive and retain until melted a portion of the ice produced during each cycle of ice production. Thus, the tray 33 and associated thermostatic switch 34 serve the same function as the previously described thermostatic switch 24 including a capillary tube 25 which itself forms the ice receiving and retaining means.

A third form of means for receiving and retaining a portion of the ice produced and means responsive to the retention of ice for delaying the operation of the ice producing mechanism is illustrated in FIGURE 6, and is shown as an alternative embodiment in the schematic wiring diagram of FIGURE 3. There, an ice receiving pan 37 is shown, which pan has openings therethrough for the passage of water therefrom. Preferably, the pan 37 is mounted for pivotal movement and has associated therewith electrical contact elements, such as in a microswitch 40, which are operated in response to pivotal movement of the pan 37. The pan 37 is disposed in the path of delivery of ice from the ice producing mechanism 12 to the bin 11, to receive and retain a portion of the ice produced and delivered. As ice is received by the pan 37, the biasing force of a spring 41 is overcome, and the pan 37 moves pivotally in response to the weight of ice received. As a result, the electrical contact elements are opened, in response to the pivotal movement of the pan 37. Subsequently, as the ice retained in the pan 37 melts, the water resulting from the melting ice drains through the openings provided in the pan and, in the absence of the weight required to overcome the biasing force of the spring 41, the electrical contact elements are closed.

The operation of the pan 37 and associated electrical contacts is substantially similar to the operation of the control system employing thermostatic switches as previously described, and a discussion in detail is not considered to be required.

Accordingly, it is considered apparent that a novel control system for use with the flake ice machine has been described which precludes the possibility of mechanical or electrical failure of the harvesting means of a flake ice machine due to an over-iced condition, by delaying the initiation of a cycle of ice production until such time as the excessive ice formed on the freezing surface on stopping of the ice producing mechanism has melted and the freezing surface is again sufficiently clear to permit operation of the harvesting means.

In the drawings and specification there have been set forth preferred embodiments of the invention and, although specific terms are employed, they are used in a generic and descriptive sense only and not for purposes of limitation, the scope of the invention being defined in the claims.

I claim:
1. In an ice machine having a freezing surface, means for refrigerating the freezing surface for the formation of ice thereon, harvesting means mounted to engage ice upon relative movement between the same and the freezing surface for removing ice from the freezing surface in flake form, means for receiving and storing flake ice delivered from the harvesting means, and a control system effective to control the cycling of ice production in response to the quantity of ice in said storage means to produce ice as needed to replenish the quantity stored; the combination therewith of means for delaying the initiation of a cycle of ice production comprising:
   ice receiving means disposed in the path of delivery of flake ice from the harvesting means to the storage means for receiving and retaining a portion of the ice produced during a cycle of ice production until such retained ice is melted, and
   means responsive to retention of ice by said receiving means and operatively connected to the control system for precluding the initiation of a cycle of ice production during retention of ice by said receiving means and for permitting the initiation of a cycle of ice production upon the melting of retained ice,
   whereby damage to the ice machine which would otherwise result from initiation of a cycle of ice production during an over-iced condition of the freezing surface is avoided.

2. The combination as claimed in claim 1 in which said responsive means is a thermostatic means responsive to the temperature differential between ice retained by said receiving means and ambient air within the storage means.

3. The combination as claimed in claim 1 in which said responsive means is responsive to the weight of ice retained by said receiving means.

4. In an ice machine having a freezing surface, means for refrigerating the freezing surface for the formation of ice thereon, harvesting means mounted to engage ice upon relative movement between the same and the freezing surface for removing ice from the freezing surface in flake form, means for receiving and storing flake ice delivered from the harvesting means, and a control system effective to control the cycling of ice production in response to the quantity of ice in said storage means to produce ice as needed to replenish the quantity stored; the combination therewith of means for delaying the initiation of a cycle of ice production comprising:
   a capillary tube formed into a conical coil and disposed in the path of delivery of flake ice from the harvesting means to the storage means for receiving and retaining a portion of the ice produced during a cycle of ice production until such retained ice has melted, and
   thermostatic means responsive to the temperature differential between ice retained by said capillary tube coil and ambient air within the storage means and operatively connected to the control system for precluding the initiation of a cycle of ice production during retention of ice by said receiving means and for permitting the initiation of a cycle of ice production upon the melting of retained ice,
   whereby damage to the ice machine which would otherwise result from initiation of a cycle of ice production during an over-iced condition of the freezing surface is avoided.

5. In an ice machine having a freezing surface, means for refrigerating the freezing surface for the formation of ice thereon, harvesting means mounted to engage ice upon relative movement between the same and the freezing surface for removing ice from the freezing surface in flake form, means for receiving and storing flake ice delivered from the harvesting means, and a control system effective to control the cycling of ice production in response to the quantity of ice in said storage means to produce ice as needed to replenish the quantity stored; the combination therewith of means for delaying the initiation of a cycle of ice production comprising:

an ice receiving pan disposed in the path of delivery of flake ice from the harvesting means to the storage means for receiving and retaining a portion of the ice produced during a cycle of ice production until such retained ice is melted and having at least one opening for the passage of water therefrom upon melting of the retained ice, and thermostatic means including a capillary tube positioned within said pan and responsive to the temperature differential between ice retained by said pan and ambient air within the storage means and operatively connected to the control system for precluding the initiation of a cycle of ice production during the retention of ice by said pan and for permitting the initiation of a cycle of ice production upon the melting of retained ice, whereby damage to the ice machine which would otherwise result from initiation of a cycle of ice production during an over-iced condition of the freezing surface is avoided.

6. In an ice machine having a freezing surface, means for refrigerating the freezing surface for the formation of ice thereon, harvesting means mounted to engage ice upon relative movement between the same and the freezing surface for removing ice from the freezing surface in flake form, means for receiving and storing flake ice delivered from the harvesting means, and a control system effective to control the cycling of ice production in response to the quantity of ice in said storage means to produce ice as needed to replenish the quantity stored; the combination therewith of means for delaying the initiation of a cycle of ice production comprising:

an ice receiving pan disposed in the path of delivery of flake ice from the harvesting means to the storage means for receiving and retaining a portion of the ice produced during a cycle of ice production until such retained ice is melted and having at least one opening for the passage of water therefrom upon the melting of the retained ice and said pan being mounted for downward pivotal movement upon the receipt of the portion of ice, and means responsive to pivotal movement of said pan upon the receipt of the portion of ice and operatively connected to the control system for precluding the initiation of a cycle of ice production during the retention of ice by said pan and for permitting the initiation of a cycle of ice production upon the melting of retained ice, whereby damage to the ice machine which would otherwise result from initiation of a cycle of ice production during an over-iced condition of the freezing surface is avoided.

References Cited by the Examiner

UNITED STATES PATENTS 2,877,632    5/1955    Chaplik et al. _____ 62—137 X

ROBERT A. O'LEARY, *Primary Examiner.*

W. E. WAYNER, *Assistant Examiner.*